United States Patent [19]

Weihrauch

[11] Patent Number: 5,045,267
[45] Date of Patent: Sep. 3, 1991

[54] PROCESS AND APPARATUS FOR PRODUCING BRISTLE ARTICLES

[75] Inventor: Georg Weihrauch, Wald-Michelbach, Fed. Rep. of Germany

[73] Assignee: Coronet-Werke Heinrich Schlerf GmbH, Waldmichelbach, Fed. Rep. of Germany

[21] Appl. No.: 401,445
[22] PCT Filed: Feb. 3, 1988
[86] PCT No.: PCT/EP88/00075
 § 371 Date: Sep. 13, 1989
 § 102(e) Date: Sep. 13, 1989
[87] PCT Pub. No.: WO89/06920
 PCT Pub. Date: Aug. 10, 1989
[51] Int. Cl.$^5$ .............. B29C 45/14; B29C 45/36
[52] U.S. Cl. .................. 264/243; 264/277; 264/278; 425/111; 425/121; 425/123; 425/577; 425/595
[58] Field of Search ............. 264/243, 275, 278, 277, 264/279, 279.1; 425/111, 121, 112, 122, 117, 123, 125, 547, 553, 577, 595

[56] References Cited

U.S. PATENT DOCUMENTS

| 2,643,158 | 6/1953 | Baldanza | 264/243 |
| 2,666,954 | 1/1954 | Potter | 264/274 |
| 4,106,745 | 8/1978 | Carrow | 264/275 |
| 4,352,772 | 10/1982 | Bezner | 264/275 |
| 4,609,228 | 9/1986 | Bickel | 264/243 |
| 4,635,313 | 1/1987 | Fassler | 264/243 |
| 4,637,660 | 1/1987 | Weihrauch | 264/243 |
| 4,892,698 | 1/1990 | Weihrauch | 264/243 |

FOREIGN PATENT DOCUMENTS 7115606  11/1971  Netherlands ............ 264/243

Primary Examiner—Jay H. Woo
Assistant Examiner—Jeremiah F. Durkin, II
Attorney, Agent, or Firm—Antonelli, Terry, Stout & Kraus

[57] ABSTRACT

A process and apparatus for the production of bristle articles include introducing the plastic bristles in the form of individual bristles or bristle strands through channels and sleeves extending the latter in to a mould for the bristle carrier, followed by thermal melting on their end located on the mould for formation of a thickened portion and the thickened portion on the bristle ends formed during melting is then sealingly engaged on the opening of the sleeve projecting into the mould. During the filling of the mould, the bristles and sleeve are kept in position within the same and the sleeve and the thickened portion on the bristle end tightly engaging against the opening of the sleeve are enveloped by the bristle carrier material during mould filling and then the sleeve is removed from the bristle carrier.

21 Claims, 2 Drawing Sheets

PROCESS AND APPARATUS FOR PRODUCING BRISTLE ARTICLES

BACKGROUND OF THE INVENTION

The invention relates to a process and apparatus for producing bristle articles, comprising a bristle carrier of a mouldable or foamable material and plastic bristles anchored therein, with the bristles, in the form of single bristles or bristle strands, being inserted through channels and sleeves extending the same into a mould for the bristle carrier and being thermally melted at the end thereof located in the mould for forming a thickened portion, which is then sealingly engaged at the opening of the sleeve projecting into the mould, and with the mould being subsequently filled with the bristle carrier material.

Since the appearance of plastics, numerous attempts have been made to utilize the thermoplastic behavior of plastics for producing the connection or joint between bristles and bristle carriers. Thus, it was proposed in, for example (German Patent 355 645), to introduce the fixing ends of the bristles into a mould for the bristle carrier and to fill the cavity with a thermally plasticizable material.

This process was modified in, for example, (German Patent 895 140 in such a way that the same materials were used for the bristles and bristle carrier, namely polyamides or polyurethanes, so that at the elevated processing temperature a type of thermal fusion occurs between the two materials. However, this only makes it possible to produce bristle articles with the material-specific characteristics of the particular material used and which are only able to meet specific use requirements. In addition, the specifically proposed materials are relatively high-grade plastics, which would lead to an unacceptable price increase for many bristle articles.

Nowadays bristle carriers are generally produced by a foaming or injection moulding process, which therefore immediately suggests itself for performing the aforementioned process. However, in injection moulding problems have occurred, because the liquid material injected into the mould penetrates between the bristle and between the bristles and the channels guiding them so that, after hardening, there is an undesired, irregular bristle-side sealing face on the bristle carrier. In the vicinity of its attachment to the bristle carrier, the bristle bundle also looses its elasticity and, as the penetration does not take place uniformly, in certain circumstances the different bristle bundles can have different bending characteristics. It is either impossible or only possible with great effort and expenditure to subsequently clean the attachment points.

Therefore numerous attempts have been made such as, for example, in DE-OS 29 22 877, to seal the guide channel for each bristle bundle, in that e.g. the injection moulding material is initially injected with limited pressure and prehardened on one mould wall and only then is the larger quantity of injection moulding material introduced into the mould. This process is extremely complicated if it is wished to obtain a completely satisfactory sealing face on the bristle carrier. In addition, for assisting rapid solidification of the material in the bristle attachment area, an intense cooling of the channels have been produced, which is impossible when the bristle bundles are closely juxtaposed. The proposal to produce a counterpressure to the injection moulding pressure in the guide channels is also not practicable, because this counterpressure leads to an irregular sealing face on the bristle carrier. The same applies with respect to the sealing of the openings of the guide channels prior to the injection moulding process and which are then opened after the pressure reduction in the mould and subsequently the bristle strands are then pressed into the still soft plastic material. This also impairs adhesion between the bristles and the bristle carrier material. The problem is also not solved by mechanical seals in the vicinity of the guide channels, e.g. as a result of a conical constriction of the opening or sealing lips located at this point, because it is not possible to pack the bristles sufficiently tightly together to ensure that no capillary spaces are left between them.

To improve the binding of the bristles into the bristle carrier, it is also Proposed in, for example, German Patent 845 933, French Patent 1 453 829 and U.S. Pat. Nos. 2 643 158 and 2 655 409, to melt and optionally deform the bristle ends extending into the cavity, so that the end of each bristle bundle is provided with a thickened portion exceeding its diameter and which is positioned at a distance from one mould wall. After injecting or foaming around the bristle end, the latter are positively and non-positively anchored in the bristle carrier, so that an adequate extraction resistance is obtained However, this does not solve the problem of the bristle carrier material appearing in the guide channels of the bristle strands and between the bristles.

A number of proposals such as described, for example, in EP-OS 142 885, EP-OS 149 996 and German Patent 35 11 528, deal with the special problem of producing the thickened portion and sealing the bristles or bristle bundles in the guide channels of the mould with respect to the bristle carrier material injected into the same. Thus, in one (EP-OS 142 885 the bristle bundles are introduced into the guide channels of a holding plate and are melted at the ends projecting above the same to give thickened portions. The holding plate with the thickened portions projecting over the same is then brought to the open side of an injection mould until the latter is tightly sealed and the bristle carrier material is then injected into the mould. Under the action of the injection moulding pressure, the thickened portions are supposed to sealingly engage with the openings of the guide channels, so as to prevent the penetration of bristle carrier material between the bristles on the one hand and between the bristles and the wall of the guide channels on the other. However, this proposal is not successful in practice. The injection moulding pressure builds up virtually isostatically in the mould, so that it also migrates behind the thickened portions and leads to the opposite to what is desired. Namely, the bristle bundles are drawn into the mould and the bristle carrier material penetrates between the bristles in the guide channels.

In a further process described in EP-OS 149,996 the bristle ends are melted outside the mould, subsequently introduced into the latter through the guide channels at high speed and initially compressed against a plate, so as to give a thickening to the still plastic bristle ends. The exertion of pressure on the thickened portions is intended to sealingly engage them against the guide channel openings and subsequently the bristle carrier material is injected. However, this process is also unusable in practice, because without technical aids acting directly on the thickened portion, a sufficiently high contact pressure on the openings is not possible.

Better results can be obtained with a process described for example, in German Patent 35 11 528, if the bristles projecting through the guide channles into the mould are melted at their ends and the resulting thickened portion is brought up to the guide channel opening under tension on the bristles. This process requires no measures within the mould cavity for producing the necessary sealing forces, the latter being applied from outside the mould and precisely with the order of magnitude necessary for a satisfactory seal. A particularly favourable process variant provides for the displaceable mounting of a sleeve within the guide channel and which is used for guiding the bristle strands or bundles. This guide sleeve initially projects into the mould cavity and the bristle ends project over its opening. The bristle ends are melted and shaped onto the guide sleeve opening, accompanied by the formation of a thickened portion. The sleeve is subsequently retracted into the guide channel and the thickened portion is sealingly drawn against its opening or the guide channel opening.

In the three latter cases the anchoring of the bristles within the bristle carrier takes place in that an undercut is formed between the thickened portion in the mould cavity and the mould wall having the guide channels and the bristle carrier material flows into said undercut. Thus, the bristles are anchored directly below the bristle carrier surface and, consequently, have little or only an inadequate guidance within the bristle carrier material. In addition, the bristle carrier material flowing into the undercut only has a very limited thickness, so that it can only absorb limited extraction forces acting on the bristles. Finally, the quality of the anchoring is largely dependent on the extent to which the undercut or a specific size thereof can be guaranteed. In view of the plastic deformation, this is only possible to a very limited extent.

SUMMARY OF THE INVENTION

The aim in underlying the present invention essentially resides in providing the bristles with a greater guidance length within the bristle carrier and to increase the extraction resistance of the bristles.

According to the process of the present invention during the filling of the mould, the bristles and sleeve retain their position therein, and the sleeve and the thickened portion on the bristle ends tightly engaging on its opening are enveloped by the bristle carrier material and the sleeve is removed from the bristle carrier after the filling of the mould with the bristle carrier material.

As a result of the inventive measure the sleeve, together with the bristles guided by it and the thickened portion sealingly resting on its opening are located within the mould cavity and spaced from the mould wall, the thickened portion on the bristle ends decisive for the anchoring effect are moved more deeply into the bristle carrier material, so that the thickened portions are no longer located directly below the surface. As the sleeve is also enveloped by bristle carrier material during the filling of the mould, following mould removal there is a cylindrical gap between the bristles and the bristle carrier, but this can be sufficiently narrowly toleranced in order to laterally guide the bristles. In particular, it is also possible to pull the sleeve prior to opening the mould sufficiently early so that the still viscose to plastic carrier material, while stopping the internal pressure in the mould, is still sufficiently deformable and the gap left behind by the sleeve is completely or substantially closed. Compared with the known processes, this gives a greater bristle guidance length. Whereas in the known processes the shape of the undercut and the volume penetrating the latter have limits placed on them because the outside of the bristle carrier must be as planar as possible, in the inventive process the shape and volume of the undercut can be optimized, because the material penetrating there is now above the surface and a planar surface can be ensured. Finally, the inventive process leads to the advantage that even in the case of an incorrect sealing of the thickened portion on the sleeve opening, the penetrating bristle carrier material still solidifies within the guidance length, i.e. does not advance up to the bristle carrier surface. Thus, it is not visible and can also have no negative influence on the flexibility of the bristles, which is only determined by the bristle length outside the bristle carrier.

In the case of the inventive process, in principle, compressive or tensile forces can be used for applying the sealing forces, but tensile forces acting on the bristles is most favorable.

The inventive process offers the possibility of shaping the thickened portion on to the sleeve opening and, as stated, complete independence from the shaping of the bristle carrier and its surface is obtained.

According to an embodiment of the process, several bristles guided in adjacent channels and sleeves can be shaped at their ends to form a cohesive thickened portion and the same advantages as in the case of an individual binding in each bristle strand are obtained As a function of the nature of the sealing forces applied, it can be advantageous to cut the bristle strands to the desired bundle length before or only following the runing-in of the mould. The time of cutting to length is also highly dependent on the operation of the machine and the supply means.

For performing the process, the invention makes use of an apparatus described, for example, in German Patent 35 11 528), which comprises an at least two-part mould shaping the bristle carrier and whereof one mould part has at least one guide channel and a sleeve extending the same into the cavity for guiding the bristles, as well as a heat source acting on the bristle ends projecting from the sleeve. In the case of the known apparatus, the thickened portion is shaped on the sleeve opening rim, the sleeve is subsequently retracted together with the bristles until the thickened portion engages with the mould wall or the sleeve opening flush therewith.

The inventive apparatus is characterized in that the sleeve, at least during the filling of the mould with the bristle carrier material, is maintained in its position projecting into the mould cavity and, after filling the mould is removable from the bristle carrier by a relative movement between the bristle carrier and the mould.

Thus, unlike in the known apparatus, the sleeve remains in its position projecting into the mould cavity until the latter is filled and at the same time the sleeve is embedded in the bristle carrier material. Sealing takes place in the depth of the mould at the sleeve opening. Following solidification or in a still viscose to plastic state of the bristle carrier material, the sleeve is removed from the mould, so that either the aforementioned cylindrical gap is obtained around the bristles or the latter is constricted to such an extent that it is hardly visible or is invisible.

According to an embodiment of the invention the sleeve is displaceably guided in a bore of the mould part and can be locked at least in the position projecting into the mould cavity and can be retracted into the mould part for removal purposes.

The displaceable guidance of the sleeve has the advantage that the mould removal direction of the mould part and the sleeve need not coincide, because the sleeve can be removed by retraction prior to the mould part. This embodiment is particularly suitable for those bristle articles, which have a non-planar surface on the bristle side and from which the bristles project perpendicularly.

The locking position of the sleeve is adjustable according to a further advantageous development. This makes it possible to adjust the distance of the thickened portion from the bristle carrier surface and therefore the bristle guidance length within the bristle carrier.

According to another embodiment, the sleeve is fixed to the mould having the guide channel and the sleeve can be constructed in one piece with the mould part, in that it forms a collar extending the guide channel into the mould cavity. This construction is recommended for large series with bristles at right angles to the surface on the bristle side of the bristle carrier and a constant depth of the thickened portion.

In all the aforementioned embodiments, it is advantageous for the sleeve to be conically tapered on its face located in the mould, accompanied by the formation of a linear edge on the opening.

This construction permits a linear sealing between the thickened portion and the sleeve, which leads to the most reliable seal in operation. Moreover, between the conical face of the sleeve and the generally curved surface of the thickened portion an undercut with a maximum volume is obtained and whose cross-section is approximately V-shaped This also leads to a maximum wall thickness of the bristle carrier material at the undercut and consequently to a maximum bearing cross-section with respect to the extraction forces acting on the bristles. This can be assisted in that the thickened portion has a much larger diameter than the external diameter of the sleeve. Consequently the thickened portion extends within the bristle carrier into an area, where the entire thickness of the bristle carrier between the thickened portion and the bristle-side surface acts as a bearing crosssection, so that even higher extraction forces can be absorbed.

According to a further preferred embodiment of the apparatus, the mould part having the guide channels for the bristle strands is provided with a clamping device for the bristles inserted in the guide channels and, accompanied by the production of tensile forces on the bristles, the clamping device is movable into a position removed from the mould part.

The bristles supplied to the mould and inserted into the guide channels of one mould part are fixed by the clamping device, so that they are held in position during the running-in or the in situ foaming of the mould. Following the heating of the bristle ends projecting over the sleeve and after forming the thickened portions, the clamping device and mould part are so moved against one another that tensile forces act on the bristles, so that the thickened portions are sealingly drawn onto the face of the sleeves.

Appropriately the clamping device is displaceably guided on the mould part having the guide channels. Advantageously, the clamping device is movable in to the withdrawn position by the mould closing movement transferred to it. Thus, the closing movement of the mould is utilized, so as to simultaneously produce the sealing force between the thickened portions and the sleeves.

Preferably the clamping device is spring-loaded and movable into the withdrawn position against the spring tension. The spring tension ensures that the clamping device returns to its initial position following the opening of the mould, so that new bristles can be supplied after opening the clamping device. The tensile force acting on the bristles or the thickened portions and therefore the sealing force can be adjusted in that the closing path of the mould during which the closing movement is transferred onto the clamping device is adjustable. Instead of this, the spring tension can be adjustable. On the clamping device, it is also possible to exert an adjustable clamping force on the bristles, so that e.g. on exceeding this force the clamping device slides over the bristles.

BRIEF DESCRIPTION OF THE DRAWING

The invention is described in greater detail hereinafter relative to non-limitative embodiments and the attached drawings, wherein.

DETAILED DESCRIPTION

Figure 1:
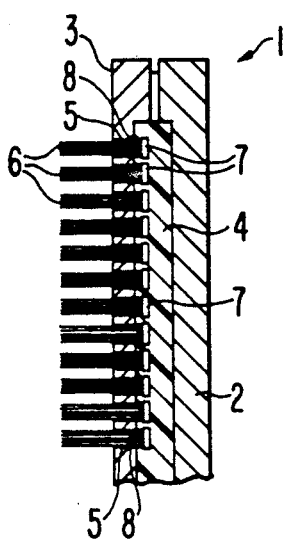
FIG.1 a diagrammatic partial section of an apparatus for producing a brush during the filling of the mould cavity.
Figure 2:
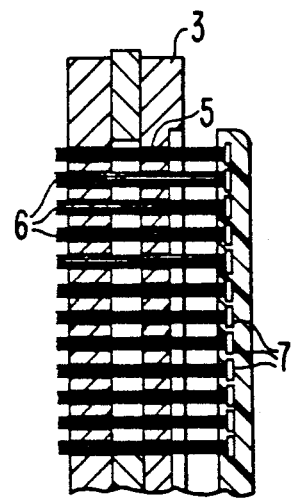
FIG.2 a view similar to FIG.1 during the mould removal of the brush.

FIG.1 shows a mould 1, e.g. an injection mould, which comprises two parts 2,3, whereof one part 3 is fixed and the facing part 2 movable for opening and closing the mould. The two mould parts 2,3 enclose a mould cavity 4, whose contour corresponds to the outer contour of bristle carrier. In the illustrated embodiment, several parallel guide channels 5 are provided on the mountingside mould part 3 and a bristle strand 6 is guided in each channel 5, with an end of the strand projecting the lead, whose end projects, whose end projects into the mould cavity 4. The bristle strand 6 can be supplied as cut bristle bundles or as continuous material from a reel. Prior to filling the mould cavity 4 with the bristle carrier material, the ends of the bristle strands 6 are melted in such a way that a thickened portion 7 is formed on each bristle strand. After or during the production of the thickened portion 7, the bristle strand 6 are brought in the sealing position against the opening rim 8 of the guide channels and subsequently the mould cavity 4 is filled with the bristle carrier material. When the bristle carrier material has hardened, through moving away mould part 2, the mould is opened FIG.2) and the brush ejected and the bristle strands 6 are drawn through the guide channels 5 of the fixed mould part 3.

Figure 3:
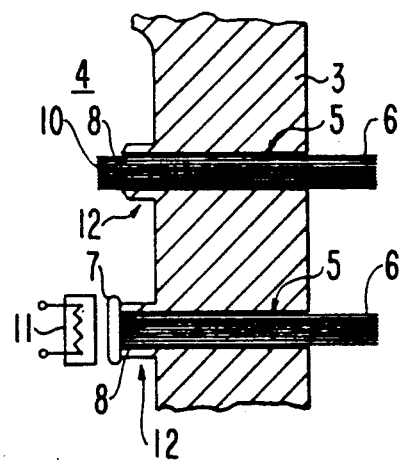
FIG.3 a diagrammatic representation of two process stages during the production of the brush.

FIG.3 shows the essential process stages on a larger scale and it is also possible to see that the guide channel is extended into the mould cavity by a sleeve 12. The bristle strand 6 is introduced into the guide channel 5 of mould part 3 until its front end 10 has passed through the opening 8 of guide channel 5 or sleeve 12 and projects into mould cavity 4. The end 10 of bristle strand 6 is melted to form a thickened portion 7 and in the represented embodiment a heat source 11 is provided, which produces the necessary softening temperature by contact or in a contact-free manner. The thus formed thickened portions 7 is brought into the sealing position on opening 8, e.g. by pulling on the bristle strand 6. Thus, between the back of the thickened portion 7 and the rim of opening 8 of sleeve 12, an undercut 13 is formed (FIGS. 4 and 5), which can be penetrated by the fluid bristle carrier material.

Figure 4:
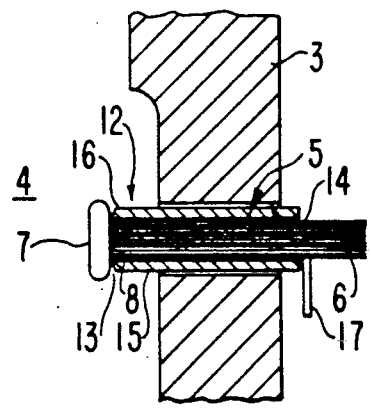
FIG.4 a partial view of a first embodiment of the sleeve similar to FIG.3.

The embodiment according to FIG.4, the guide channel 5 is exclusively formed by a guide sleeve 15, which is externally tightly and displaceably guided in a bore 14 of mould part 3. The end face 16 of sleeve 15 is provided with a conical taper against which the thickened portion 7 is shaped. Prior to filling mould cavity 4 or plasticizing the material located therein, the bristle strand 6 is retracted and the thickened portion 7 again passes into a sealing position on the opening rim 8 of sleeve 15. It is externally possible to provide a detent 17 for guide sleeve 15, so as to fix the same in the position shown in FIG.4 or in any random different position within mould part 3.

Figure 5:
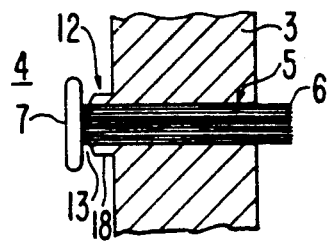
FIG.5 a detail section of another embodiment of the sleeve.

FIG.5 shows an embodiment, in which the sleeve 12 is formed by a collar 18 in one piece with mould part 3 and projects into mould cavity 4, which once again conically tapers to the opening 8 and extends guide channel 5 into the mould cavity 4. It is clear that the thickened portion 7 has a larger external diameter than the collar 18 for obtaining an even better anchoring effect.

Figure 6:
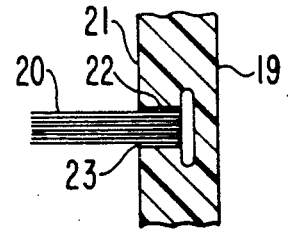
FIG.6 a detail section of a brush.

FIG.6 finally shows an enlarged detail section from a brush with a bristle carrier 19 and a cut-to-length bristle bundle 20, whose internal thickened portion 7, including undercut 13 is embedded in the bristle carrier at a distance from its bristle-side, planar surface 21. After mould removal, the sleeve 12 of mould part 3 leaves behind a cylindrical gap 22 between the bristle carrier 19 and the bristle bundle 20, which is used for guiding the bristle bundle. This gap 22 can be completely or substantially closed by early mould removal of the displaceable sleeve 15 prior to the solidification of the bristle carrier material, in that the just still plastic material, under the action of the pressure prevailing in the mould, penetrates the gap, but not the capillary spaces between the individual bristles, or between the bristles and the guide channel.

Figure 7:
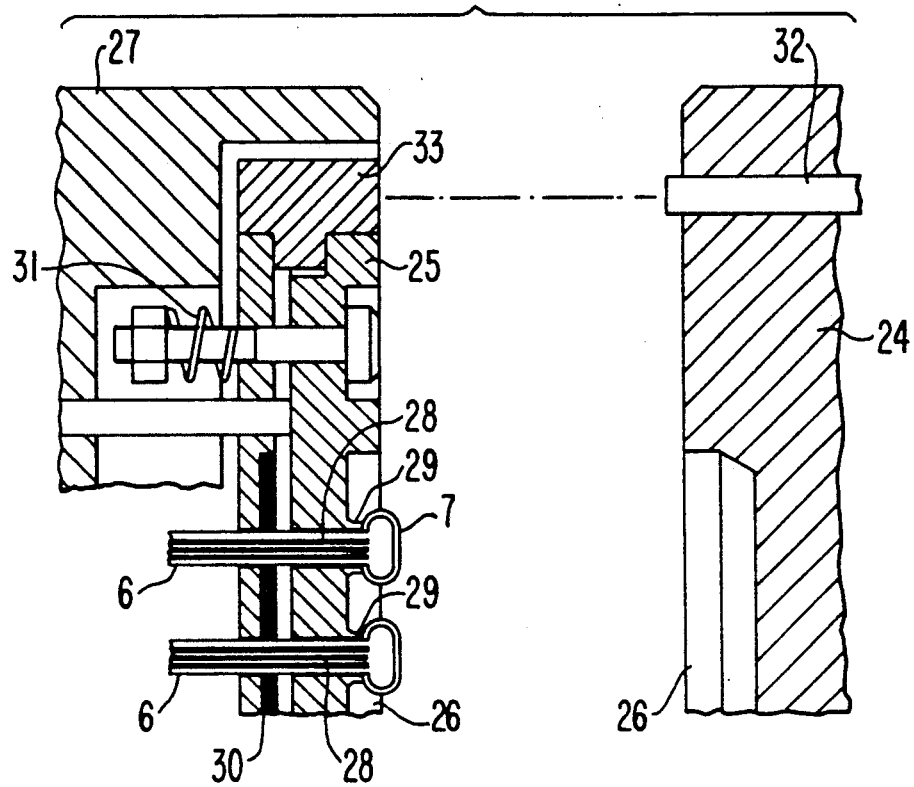
FIG.7 a diagrammatic partial section of a modified construction of the apparatus in the open position.
Figure 8:
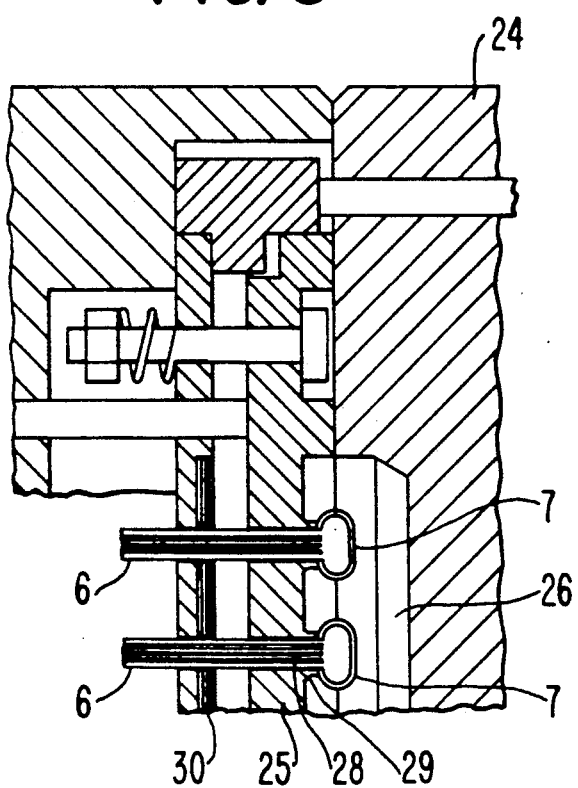
FIG.8 a representation corresponding to FIG.7 in the closed position.

FIGS.7 and 8 show another embodiment of the mould, which once again has two parts 24 25, whereof one part 24 is movable for opening the mould cavity 26 (FIG.8), whereas the other part 25 is fixed, but detachably located in a mould receptacle 27. The mould part 25 once again has guide channels 28 with a collar 29 extending the same into the mould cavity and into which the bristle strands 6 can be inserted, so that the thickened portion 7 are formed on the end thereof projecting into the mould cavity 26. Upstream of the mould part 25, a clamping device 30 is provided in the feed direction of the bristle strands 6 and, for example, comprises plates displaceable against one another and as a result of which the bristle strands are held in position.

Following the shaping of the thickened portions 7, the bristle strands are retracted by the clamping device 30, so as to sealingly engage the thickened portion 7 on collars 29. For this purpose, the clamping device 30 is displaceably guided on mould part 25 and is held by springs 31 in the initial position shown in FIG.7. On closing the mould, the mould part 24 is moved towards the fixed mould part 25. On mould part 25 are provided spacing bolts 32, which can be adjustable. Just prior to the closing of the mould cavity 26, the spacing bolts engage on a pressure plate 33, to which is fixed the clamping device 30. During the further moving in of mould part 24, the clamping device 30 is moved away from mould part 25, so that during this movement tensile forces can be made to act on the bristle strands 6. After filling the mould cavity 26 with the bristle carrier material and directly before or during the withdrawal of mould part 24, clamping device 30 is released, so that the bristle strands 6 are freed for the ejection of the brush.

We claim:

1. Process for a production of bristle articles comprising a bristle carrier made from one of a mouldable and foamable material and plastic bristles anchored in the bristle carrier the method comprising the steps of introducing the bristles in the form of one of individual bristles and bristle strands into a mould for the bristle carrier through channels and sleeves for extending the bristles into the mould for the bristle carrier, thermally melting an end of the bristles located in the mould for forming a thickened portion, sealingly engaging the thickened portion on the an opening of the sleeve projecting into the mould, and subsequently introducing the bristle carrier material into the mould so as to fill the mould with bristle carrier material, maintaining the bristles in the same relative position within the sleeve during the filling of the mould with the bristle carrier material such that the sleeve and the thickened portion sealingly engaging the opening of the sleeves are enveloped by the bristle carrier material, and removing the sleeve from the bristle after filling the mould with the bristle carrier material.

2. Process according to claim 1, wherein the step of removing the sleeve is carried out at a time when the bristle carrier material is already dimensionally stable.

3. Process according to claim 1, further compromising the step of subjecting the bristle carrier material to an action of one of an injection and a foaming pressure prevailing in the mould during the step of removing the sleeve at a time when the bristle carrier material is still plastic so as to enable the bristle carrier material to fill a gap remaining when the sleeve is removed.

4. Process according to one of claims 1, 2, or 3, wherein the step of sealingly engaging is carried out before the step of introducing the bristle carrier material into the mould.

5. Process according to one of claims 1, 2, or 3, wherein the step of sealingly engaging is carried out during the step of thermally melting the bristles to form the thickened portion.

6. Process according to one of claims 1, 2 or 3, wherein the step of sealingly engaging includes applying tensile forces on the bristles.

7. Process according to one of claims 1, 2 or 3, wherein the step of sealingly engaging includes shaping the thickened portion onto the sleeve opening.

8. Process according to one of claims 1, 2 or 3, wherein the step of thermally melting to form the thickened portion includes shaping the thickened portion so that an under cut is formed between the thickened portion and the opening of the sleeve.

9. Process according to one of claims 1, 2 or 3, wherein the step of thermally melting to form the thickened portion includes guiding and reshaping the ends of several bristles in adjacent channels and sleeves to form a cohesive thickened portion.

10. Process according to one of claims 1, 2 or 3, wherein the bristles and bristle carrier are made from different plastics.

11. Apparatus for a production of bristle articles comprising a bristle carrier made from one of a mouldable and foamable material and plastic bristles in the form of one of individual bristles and bristle strands, the apparatus comprising a mould having at least a first mould part and a second mould part for shaping the bristle carrier, at least one guide channel and a sleeve provided in said first mould part and extending into the mould cavity for guiding the bristles into the mould cavity, a heat source acting on ends of the bristles projecting beyond an end of the sleeve into the mould cavity for forming a thickened portion at the ends of the bristles from bristle material, means for maintaining the sleeve in a position projecting into the mould cavity at least during a filling of the mould with the bristle carrier material and for enabling a removal of the sleeve from the bristle carrier during the filling of the mould with the bristle carrier material through a relative movement between the mould and the bristle carrier, a clamping device displacably mounted on said first mould part for clamping the bristles inserted into said at least one guide channel in said first mould part and for producing tensile force on the bristles by movement of the clamping device into a position remote from said first mould part, and means for displaceably guiding the clamping device on said first mould part.

12. Apparatus according to claim 11, wherein said first mould part includes a bore means for displaceably guiding the sleeve in the first mould part, and wherein said means for maintaining the sleeve in the position projecting into the mould includes a detent means for locking the sleeve at least in the position projecting into the mould cavity and for releasing the sleeve so as to permit a retraction of the sleeve into the mould part.

13. Apparatus according to claim 12, wherein said detent means is adjustable so as to permit an adjustment of the position of the sleeve in the first mould part.

14. Apparatus according to claim 11, wherein the sleeve is constructed in one piece with said first mould part of the two-part mould.

15. Apparatus according to claim 11, wherein the sleeve in constructed as a collar projecting upwardly from an end of the least one guide channel into the mould cavity.

16. Apparatus according to claim 11, wherein an end face of the sleeve located in the mould cavity is conically tapered and includes a linear edge formed on an opening thereof.

17. Apparatus according to claim 11, wherein an external diameter of the sleeve is less than an external diameter of the thickened portion on the bristle ends.

18. Apparatus according to claim 11, wherein means are provided for causing said clamping device to be moved into the remote position by a closing movement of the two-part mould.

19. Apparatus according to claim 18, wherein spacing bolts are located on the second mould part and are adapted to actuate the clamping device upon a closing of two-part mould.

20. Apparatus according to claim 19, wherein said means for causing the clamping device to be removed to the remote position includes spring means for spring loading the clamping device.

21. Apparatus according to claim 20, wherein means are provided for adjusting the tensile forces acting on the bristles by varying at least one of an effective length of the spacing bolts, a biasing force of the spring loading, and a clamping force applied by the clamping device to the bristles.

* * * * *